(12) United States Patent
Tago et al.

(10) Patent No.: US 11,394,257 B2
(45) Date of Patent: Jul. 19, 2022

(54) ROTOR CORE, ROTOR OF ROTARY ELECTRICAL MACHINE, ROTARY ELECTRICAL MACHINE, AND AUTOMOTIVE AUXILIARY ELECTRICAL SYSTEM

(71) Applicant: Hitachi Automotive Systems, Ltd., Hitachinaka (JP)

(72) Inventors: Kazutami Tago, Tokyo (JP); Hiroshi Kanazawa, Hitachinaka (JP); Kenji Nakayama, Hitachinaka (JP); Yuji Tsuji, Tokyo (JP); Takayuki Chikaoka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 258 days.

(21) Appl. No.: 16/648,958

(22) PCT Filed: Aug. 3, 2018

(86) PCT No.: PCT/JP2018/029172
§ 371 (c)(1),
(2) Date: Mar. 19, 2020

(87) PCT Pub. No.: WO2019/064923
PCT Pub. Date: Apr. 4, 2019

(65) Prior Publication Data
US 2020/0287430 A1   Sep. 10, 2020

(30) Foreign Application Priority Data

Sep. 29, 2017 (JP) .............................. JP2017-191937

(51) Int. Cl.
*H02K 1/27* (2022.01)
*H02K 1/276* (2022.01)
(Continued)

(52) U.S. Cl.
CPC .............. *H02K 1/276* (2013.01); *B60T 13/74* (2013.01); *B62D 5/04* (2013.01); *H02K 21/16* (2013.01); *H02K 29/03* (2013.01)

(58) Field of Classification Search
CPC ........ H02K 1/276; H02K 21/16; H02K 29/03; H02K 1/2766; B60T 13/74; B62D 5/04; B62D 5/046
See application file for complete search history.

(56) References Cited

U.S. PATENT DOCUMENTS

| | | | |
|---|---|---|---|
| 9,035,520 B2 * | 5/2015 | Filip | ........................ H02K 1/27 310/156.53 |
| 2004/0189132 A1 | 9/2004 | Horst | |
| 2018/0115202 A1 | 4/2018 | Hirotani et al. | |

FOREIGN PATENT DOCUMENTS

| | | |
|---|---|---|
| JP | 2010-246301 A | 10/2010 |
| JP | 2014-79068 A | 5/2014 |

(Continued)

OTHER PUBLICATIONS

Machine Translation, ASANO, JP-2014079068-A, May 2014. (Year: 2014).*

(Continued)

*Primary Examiner* — Thomas Truong
(74) *Attorney, Agent, or Firm* — Crowell & Moring LLP

(57) ABSTRACT

A cogging torque in a rotary electric machine is sufficiently reduced. The rotor core includes a magnetic pole having the base formed on the outer peripheral side of the storage space. A plurality of magnetic poles are provided in the circumferential direction, and include the first protrusion protruding from the base in one circumferential direction along the outer periphery of the rotor core, and the second protrusion which is provided on the opposite side to with the base interposed and protrudes from the base along the outer periphery of the rotor core in the other circumferential (Continued)

direction. At least one of the first protrusion and the second protrusion is located on the outer peripheral side from the first line segment which is a virtual line connecting the end of the first protrusion and the end of the second protrusion, and is provided such that the space is provided with respect to the first line segment.

8 Claims, 13 Drawing Sheets

(51) Int. Cl.
    *B60T 13/74*     (2006.01)
    *B62D 5/04*     (2006.01)
    *H02K 21/16*     (2006.01)
    *H02K 29/03*     (2006.01)

(56) References Cited

FOREIGN PATENT DOCUMENTS

| | | | |
|---|---|---|---|
| JP | 2014079068 A | * | 5/2014 |
| JP | 2014-239633 A | | 12/2014 |
| JP | 2016-178863 A | | 10/2016 |
| WO | WO 2016/170624 A1 | | 10/2016 |

OTHER PUBLICATIONS

International Search Report (PCT/ISA/210) issued in PCT Application No. PCT/JP2018/029172 dated Nov. 20, 2018 with English translation (four (4) pages).

Japanese-language Written Opinion (PCT/ISA/237) issued in PCT Application No. PCT/JP2018/029172 dated Nov. 20, 2018 (seven (7) pages).

* cited by examiner

ROTOR CORE, ROTOR OF ROTARY ELECTRICAL MACHINE, ROTARY ELECTRICAL MACHINE, AND AUTOMOTIVE AUXILIARY ELECTRICAL SYSTEM

TECHNICAL FIELD

The present invention relates to a rotor core, and a rotor using the rotor core, a rotary electric machine, and an automotive auxiliary electrical system.

BACKGROUND ART

In recent years, with the shift from hydraulic systems to electric systems and the expansion of the hybrid and electric vehicle markets, the mounting rate of electric power steering (hereinafter, referred to as EPS) and electric brake devices has increased rapidly. In addition, with the spread of vehicles which partially automate driving operations such as idling stop and braking, driving comfort has been improved, and noise in the vehicle interior has been reduced.

As vibration sources originating from the electric motor, which lead to vibration and noise in the vehicle interior, there are torque fluctuation components (cogging torque and torque ripple) of the electric motor and an electromagnetic excitation force generated between the stator and the rotor of the electric motor. Among them, the vibration energy due to the torque fluctuation component propagates into the vehicle interior via the output shaft of the electric motor, and the vibration energy due to the electromagnetic excitation force propagates into the vehicle interior via the mechanical parts of the EPS device. The propagation of these vibration energies into the vehicle interior leads to vibration and noise in the vehicle interior.

For example, in the EPS device, the electric motor assists the steering wheel operation, so the driver feels the cogging torque and the torque ripple of the electric motor through the steering wheel. In order to suppress this problem, it is generally required that the electric motor used in the EPS device suppress the cogging torque to less than $1/1000$ of the assist torque and the torque ripple to less than $1/100$ of the assist torque. In addition, it is preferable that the minimum order of the spatial mode of the electromagnetic excitation force is not less than 2.

Here, the price of the electric motor is made up of the cost of materials such as magnets and windings and the cost of manufacturing. However, since the ratio of the price of magnets is particularly high, there is a strong demand for reduction in magnet cost. In addition, there is also a demand for simplification of manufacturing, reduction in required manpower and manufacturing equipment. For this reason, an electric motor used for an automotive auxiliary electrical system also needs to satisfy these demands.

As the electric motor used in the EPS device, a permanent magnet brushless motor (hereinafter, referred to as a "permanent magnet rotary electric machine") is generally used in terms of miniaturization and reliability.

Permanent magnet rotary electric machines are roughly classified into surface magnet type (SPM), which is excellent in power density, and interior permanent magnet type (IPM), which is excellent in magnet cost. In each case, magnets separated into a number corresponding to the number of poles are often used from the viewpoint of magnet cost reduction.

For example, in the interior permanent magnet type, an integral rotor core having a magnet storage space is usually used. Since the integral rotor core has high manufacturing accuracy of the rotor magnetic pole, an air gap length between the rotor magnetic pole and the stator can be reduced. Although the magnetic flux leaks from the bridge of the magnet storage space, the torque is lower than that of the surface magnet type. However, the reduction in the torque can be suppressed by shortening the air gap length. In addition, since a rectangular magnet can be used, the magnet cost can be reduced. Further, there is also an advantage that a magnet cover required for the surface magnet type is not required.

However, when rectangular magnets having uniform magnetization are arranged in the circumferential direction, if the outer periphery of the integral rotor core is formed in an annular shape, the magnetic flux distribution will not be sinusoidal shape, and the torque ripple and cogging torque cannot be sufficiently reduced. For this reason, it is necessary to reduce the torque ripple and the cogging torque by devising the magnetic pole shape, such as projecting the end of the magnetic pole on the outer peripheral side. Even when the surface magnet type is employed, the same problem occurs. Therefore, it is necessary to reduce the torque ripple and the cogging torque by devising the width and the outer curvature of the magnet. Here, if the winding method, the number of poles, the number of slots, the magnet method, etc. are different, the magnetic flux distribution will be different, so the width and outer curvature of the magnet will have different magnetic pole shapes, but the protrusion of the magnetic pole is common.

In addition, since the EPS device rotates in both forward and reverse directions, it is necessary to make the magnetic flux distribution around the magnetic pole symmetrical in both rotational directions, and a symmetrical magnetic pole is used.

A related art of a brushless motor having a symmetrical magnetic pole shape is disclosed in PTL 1. The brushless motor 1 described in PTL 1 is of an IPM type in which a magnet 16 is accommodated and fixed in a rotor 3. The rotor 3 includes a rotor core 15 formed by laminating steel plates. The rotor core 15 includes a core body portion 31, a magnet mounting hole 33, and a protruding pole 32. The magnet 16 is housed and fixed in the magnet mounting hole 33 while forming a gap portion 34. A concave portion 35 is provided between the adjacent protruding poles 32. At both ends in the circumferential direction of each protruding pole 32, a flange portion 41 is provided so as to extend the outer peripheral surface of the protruding pole 32. The flange portion 41 is provided on the outer peripheral side of the concave portion 35, and a gap 43 is formed with respect to the opposed flange portions 41.

CITATION LIST

Patent Literature

PTL 1: JP 2014-239633 A

SUMMARY OF INVENTION

Technical Problem

The brushless motor disclosed in PTL 1 has much room for improvement with respect to reduction of cogging torque.

Solution to Problem

A rotor core according to the invention is configured by a plurality of laminated plates and forming a storage space for the magnet. The rotor core includes a magnetic pole which includes a base formed on an outer peripheral side of the storage space. A plurality of the magnetic poles are provided in a circumferential direction. The magnetic pole includes a first protrusion which protrudes from the base along an outer periphery of the rotor core in one circumferential direction, and a second protrusion which is provided on an opposite side of the first protrusion with the base interposed therebetween and protrudes from the base along the outer periphery of the rotor core in another direction of the circumferential direction. At least one of the first protrusion and the second protrusion is on an outer peripheral side from a first line segment which is a virtual line connecting an end of the first protrusion and an end of the second protrusion, and is formed to provide a space with the first line segment.

A rotor according to the invention includes the rotor core described above, a rotation shaft fixed to the rotor core, and a permanent magnet disposed in the storage space.

A rotary electric machine according to the invention includes the above-described rotor and a stator having a plurality of windings and arranged to face the rotor via a predetermined air gap.

An automotive auxiliary electrical system according to the invention includes the rotary electric machine described above, and performs electric power steering or electric braking using the rotary electric machine.

Advantageous Effects of Invention

According to the invention, cogging torque can be sufficiently reduced.

DESCRIPTION OF EMBODIMENTS

Figure 1:
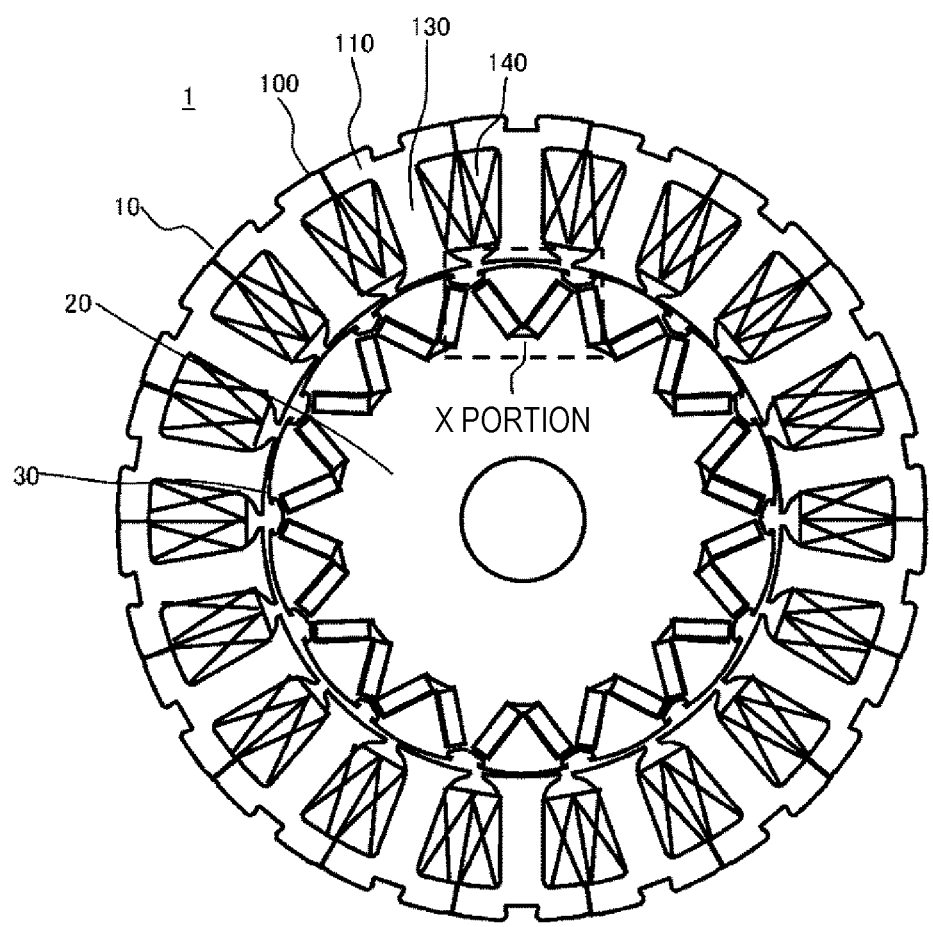
FIG. 1 is a cross-sectional view in a rotation plane of a permanent magnet rotary electric machine according to a first embodiment of the invention.

Embodiments of the invention will be described in detail with reference to the drawings as appropriate. Further, the same components in the drawings are denoted by the same reference numerals, and description thereof will be omitted.

First Embodiment

Figure 2:
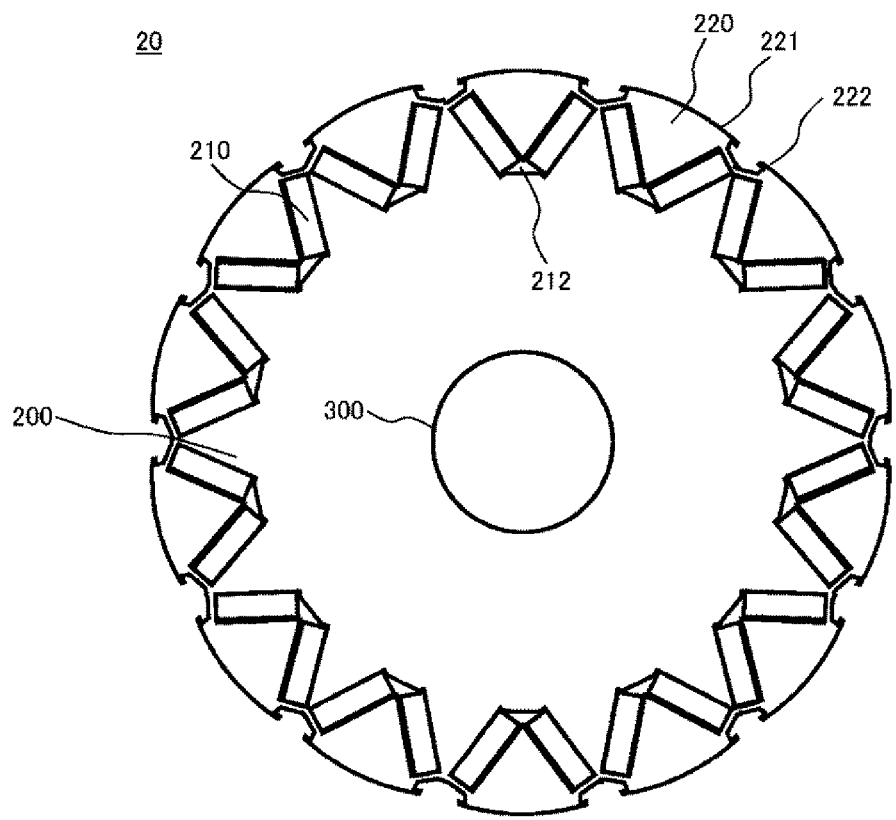
FIG. 2 is a cross-sectional view of a rotor according to the first embodiment of the invention.
Figure 3A:
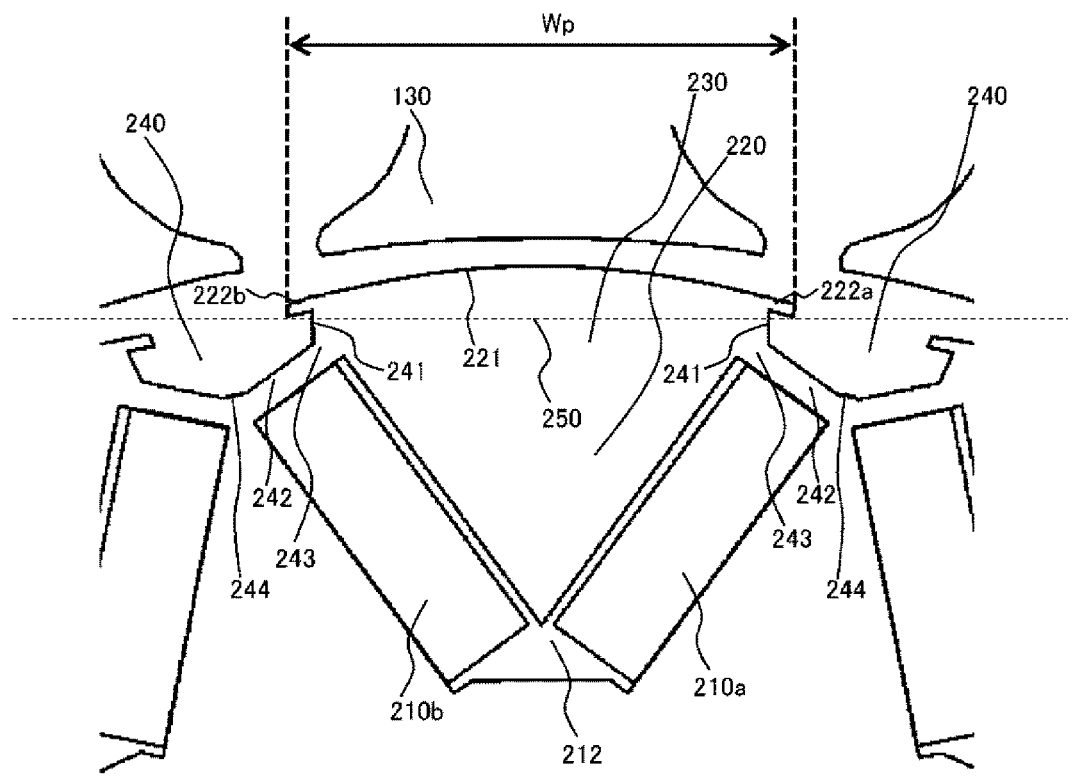
FIG. 3A is an enlarged view of the vicinity of a magnetic pole of a cross section of the rotor according to the first embodiment of the invention.
Figure 3B:
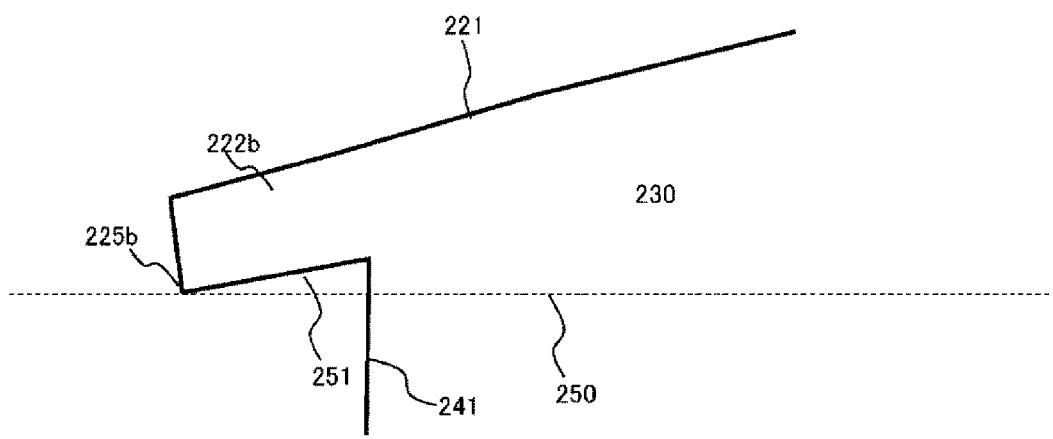
FIG. 3B is an enlarged view of the vicinity of a protruding end of the rotor according to the first embodiment of the invention.

A configuration of a permanent magnet rotary electric machine 1 including a rotor core according to a first embodiment of the invention will be described with reference to FIGS. 1 to 3B. FIG. 1 is a cross-sectional view in the rotation plane of the permanent magnet rotary electric machine 1 according to the first embodiment. FIG. 2 is a cross-sectional view of a rotor 20 according to the first embodiment. FIG. 3A is an enlarged view of the vicinity of a magnetic pole of a cross section of the rotor 20 according to the first embodiment, and is an enlarged view of an X portion surrounded by a dotted line in FIG. 1. FIG. 3B is an enlarged view of the vicinity of the protruding end in the first embodiment.

As illustrated in FIG. 1, the permanent magnet rotary electric machine 1 of this embodiment is a concentrated winding permanent magnet rotary electric machine having 14 poles and 18 slots in which a substantially annular stator is disposed on an outer peripheral side, and the substantially cylindrical rotor 20 is disposed on an inner peripheral side. An air gap 30 is provided between the stator 10 and the rotor 20. The stator 10 includes a stator core 100, a core back 110, and a plurality of windings 140, and is arranged to face the rotor 20 via the air gap 30.

The stator 10 is formed, for example, as follows. First, T-shaped teeth 130 are formed by a laminated body in which split punched cores of electromagnetic steel sheets are laminated. Next, after winding an electric wire around the teeth 130 to form the winding 140, the plurality of teeth 130 and the winding 140 are assembled into an annular shape, and are integrated by shrink fitting or press fitting into a housing (not illustrated). Thus, the stator 10 is formed.

In addition, as illustrated in FIG. 2, the rotor 20 of this embodiment includes a rotor core 200 that is an iron core in which electromagnetic steel sheets are laminated, and a shaft 300 that is a rotation axis. The outer periphery of the rotor core 200 is provided with 14 soft magnetic poles 220 in the circumferential direction. Each of the magnetic poles 220 forms a surface facing the stator 10 and is provided with protrusions 222 at both ends of a magnetic pole arc 221 serving as a magnetic pole outer peripheral surface (that is, the outer peripheral surface of the rotor core 200), and includes a V-shaped storage space 212 in which the permanent magnet 210 is stored. In the storage space 212, two rectangular permanent magnets 210 are inserted and arranged for each magnetic pole 220.

As illustrated in FIG. 3A, a first space 240 that is concave with respect to the magnetic pole arc 221 is formed between a pair of magnetic poles 220 which are adjacent in the circumferential direction. A bridge 242 is formed between the first space 240 and the storage space 212. Further, in FIG. 3A, one of the two permanent magnets 210 housed in the storage space 212 is illustrated as a first permanent magnet 210a, and the other is illustrated as a second permanent magnet 210b. The bridge 242 is connected to the magnetic pole 220 and also connected to a core outermost peripheral portion 244 in the q-axis direction located at the bottom of the first space 240 (hereinafter, referred to as a q-axis outer peripheral portion 244). In other words, the bridge 242 is formed so as to connect the magnetic pole 220 and the q-axis outer peripheral portion 244.

The magnetic pole 220 includes a base 230 which protrudes in a radial direction from the storage space 212 toward the outer diameter side, and the protrusion 222 which protrudes from the base 230 along the magnetic pole arc 221 on the opposite side in the circumferential direction. Further, in FIG. 3A, the protrusion 222 projecting in one circumferential direction is provided on the opposite side of a first protrusion 222a across the first protrusion 222a and the base 230, and the protrusion 222 projecting in the other direction in the circumferential direction is illustrated as a second protrusion 222b. Further, the base 230 includes a pair of connecting portions 243 which are connecting portions with the bridge 242, and a pair of side surface portions 241 which are in contact with the first space 240. The side surface portion 241 is disposed on the inner peripheral side in a radial direction from the protrusion 222 (the first protrusion 222a and the second protrusion 222b). The first space 240 faces the protrusion 222, the bridge 242, and the q-axis outer peripheral portion 244.

The q-axis outer peripheral portion 244 is located in the middle of the pair of magnetic poles 220 adjacent in the circumferential direction, and is provided on the inner peripheral side in the radial direction from the base 230. The q-axis outer peripheral portion 244 is arranged between two bridges 242 connected to the pair of magnetic poles 220 adjacent in the circumferential direction.

As illustrated in FIGS. 3A and 3B, a virtual line segment connecting the end of the first protrusion 222a and a second protrusion end 225b which is the end of the second protrusion 222b is defined as a first line segment 250. The surface between the second protrusion end 225b and the side surface portion 241 is located on the outer diameter side (outer peripheral side) from the first line segment 250. Thus, the second protrusion 222b is formed between the first line segment 250 and the second protrusion 222b such that a space 251 facing the first line segment 250 is provided. Further, although FIG. 3B illustrates only the shape of the second protrusion 222b in an enlarged manner, the first protrusion 222a has the same shape.

In general, a cogging torque generated in a rotary electric machine having a rotor structure having a magnetic pole shape protruding in the radial direction, in particular, a cogging torque whose order is determined according to the slot combination, can be reduced by making the magnetic pole arc radius smaller than the rotation radius of the rotor outer surface. When the magnetic pole arc radius is reduced, the cogging torque temporarily disappears at a certain magnetic pole arc radius A. However, when the magnetic pole arc radius is further reduced, the phase of the cogging torque waveform is reversed, and the cogging torque tends to increase. Such a change in the cogging torque occurs with a decrease in the magnetic flux in the air gap near the magnetic pole tip.

In addition, when the magnetic pole arc radius is too small, the distance between the magnetic pole tip and the stator increases, and the magnetic flux at that location decreases, so that the cogging torque hardly changes with the change in the shape of the magnetic pole tip.

Therefore, in a case where the cogging torque is reduced by changing the shape of the magnetic pole tip, it is not preferable that the magnetic pole arc radius becomes too smaller than the above magnetic pole arc radius A. In the following, a magnetic pole arc radius smaller than the magnetic pole arc radius A and having such a size that a change in the shape of the magnetic pole tip sufficiently affects a change in the cogging torque will be referred to as a magnetic pole arc radius B. When the magnetic pole width in the circumferential direction is increased while maintaining the magnetic pole arc radius B, the magnetic flux in the air gap near the magnetic pole tip increases, so that the same effect as increasing the magnetic pole arc radius is achieved. As a result, the cogging torque temporarily disappears, and thereafter, the phase returns to the original state, and the cogging torque tends to increase.

Here, in a case where the shape of the magnetic pole is a general semi-cylindrical shape, the magnetic resistance is small even at the magnetic pole tip, so that the change in the magnetic flux distribution of the air gap near the magnetic pole tip with respect to the change in the magnetic pole width is large, and the change of cogging torque is large. On the other hand, in the case of a structure in which protrusions are provided at both ends of the magnetic pole outer peripheral surface as illustrated in FIG. 3A as the shape of the magnetic pole tip, the magnetic flux passing through the protrusion tip decreases when the magnetic pole width or the protrusion length changes. Therefore, it is expected that the change in the magnetic flux distribution in the air gap near the magnetic pole tip with respect to the change in the magnetic pole shape becomes small, and the change in the cogging torque also becomes small. In other words, even in a case where the amount of magnetic flux per unit axial length is large, the change in the cogging torque with respect to the change in the magnetic pole width can be suppressed compared with a case where the magnetic pole has a semi-cylindrical shape. Therefore, it means that the rotary electric machine can be downsized by reducing the thickness of the rotor core.

The residual magnetic flux density is specified for the magnet used in the permanent magnet rotary electric machine, and the larger the polarity surface of the magnet, the more the magnetic flux passing through the magnetic pole. Therefore, in an interior permanent magnet (VIPM) rotary electric machine in which magnets are embedded in a V-shape, a rotor structure which can increase the area with polarity is used to increase the amount of magnetic flux passing through one magnetic pole. When the amount of magnetic flux passing through the magnetic pole increases as described above, the magnetic flux distribution in the air gap changes according to the change in the magnetic pole width, depending on the shape of the protrusion of the magnetic pole tip, and the cogging torque is affected. In other words, since the magnetic flux has sufficiently reached the tip of the protrusion, if the position of the protrusion tip changes due to a change in the magnetic pole width, the change in the magnetic flux in the air gap near the magnetic pole tip increases, resulting in a change in the magnetic pole width. The change in the cogging torque with respect to the change in the magnetic pole width becomes large. As described above, the cogging torque required in the EPS apparatus is as small as less than $\frac{1}{1000}$ of the assist torque, and thus is susceptible to such a change due to the protrusion shape of the magnetic pole tip.

In order to reduce the cogging torque, it is necessary to reduce the cogging torque due to the variation in the shape and dimensions. Therefore, it is desirable to minimize the change in the cogging torque with respect to the change in the magnetic pole width as described above, and an appropriate protrusion shape is required. However, the tip portion of the protrusion needs to have a certain thickness or more due to limitations in mass-production performance and the like. Therefore, simply reducing the thickness of the protrusion cannot be adopted. Therefore, it is considered effective to reduce the magnetic flux reaching the tip portion of the protrusion by making the root portion of the protrusion thinner.

From the above study, it has been confirmed that the following configuration is effective for reducing the cogging torque in the permanent magnet rotary electric machine.

(1) In order to suppress a sudden change in the permeance of the magnetic pole tip, a pair of protrusions are formed to protrude to the magnetic pole tip and on opposite side in the circumferential direction along the outer periphery of the rotor core. This makes it possible to moderate the change in the magnetic field in the air gap near the magnetic pole tip by utilizing a large magnetic resistance of the protrusion.

(2) In order to reduce the magnetic flux reaching the tip of the protrusion, the thickness of the root of the protrusion is made as thin as possible. With this configuration, it possible to minimize the change in the cogging torque with respect to the change in the magnetic pole width, thereby reducing the fluctuation in the cogging torque with respect to the dimensional error of the magnetic pole.

The configuration of the permanent magnet rotary electric machine 1 of this embodiment described with reference to FIGS. 1 to 3B is determined based on the results of the above study. In other words, a virtual line segment connecting the end of the first protrusion 222a and the second protrusion end 225b which is the end of the second protrusion 222b is defined as a first line segment 250. The surface between the second protrusion end 225b and the side surface portion 241 is located on the outer diameter side (outer peripheral side) from the first line segment 250. Thus, the second protrusion 222b is formed between the first line segment 250 and the second protrusion 222b such that a space 251 facing the first line segment 250 is provided. Further, although FIG. 3B illustrates only the shape of the second protrusion 222b in an enlarged manner, the first protrusion 222a has the same shape. With this configuration, it possible to reduce the cogging torque with respect to the change in a magnetic pole width Wp illustrated in FIG. 3A, while reducing the cogging torque itself. It is suitable for a rotary electric machine having a VIPM structure which can increase the amount of magnetic flux passing through one magnetic pole, such as the permanent magnet rotary electric machine 1 of this embodiment.

Further, the tip of the protrusion 222 needs to have a certain thickness or more due to restrictions in mass production. In this embodiment, for example, it is preferable that the protrusion 222 be formed so that the thickness on the root side is 40% or more of the thickness of the electromagnetic steel sheet.

In addition, in this embodiment, for both the first protrusion 222a and the second protrusion end 225b, the ends are located on the outer diameter side (the outer peripheral side) of the first line segment 250 as illustrated in FIG. 3B. Therefore, the space 251 is formed between the first line segment 250 and the space 251. However, only one of the first protrusion 222a and the second protrusion end 225b may be configured in this manner. Even in such a case, it is possible to reduce the change in the cogging torque with respect to the change in the magnetic pole width Wp to some extent while reducing the cogging torque itself.

With the use of the magnetic pole 220 having the shape described above, it is possible to obtain the rotor core 200 which is a rotor core excellent in reducing the cogging torque, the rotor 20 using the rotor core 200, and the permanent magnet rotary electric machine 1.

Figure 4:
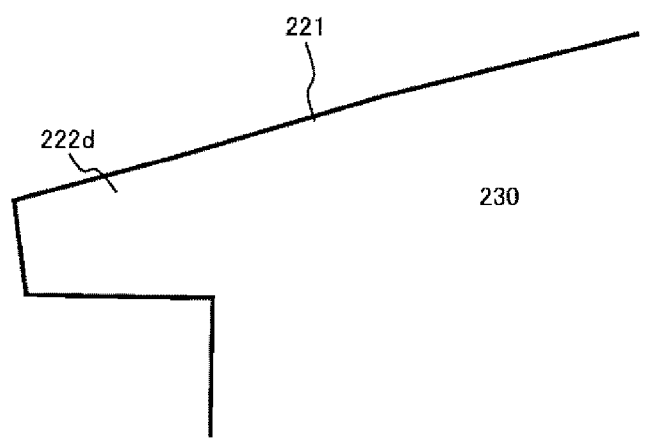
FIG. 4 is an enlarged view of the vicinity of a protrusion end of a rotor according to Comparative Protrusion Example A.
Figure 6:
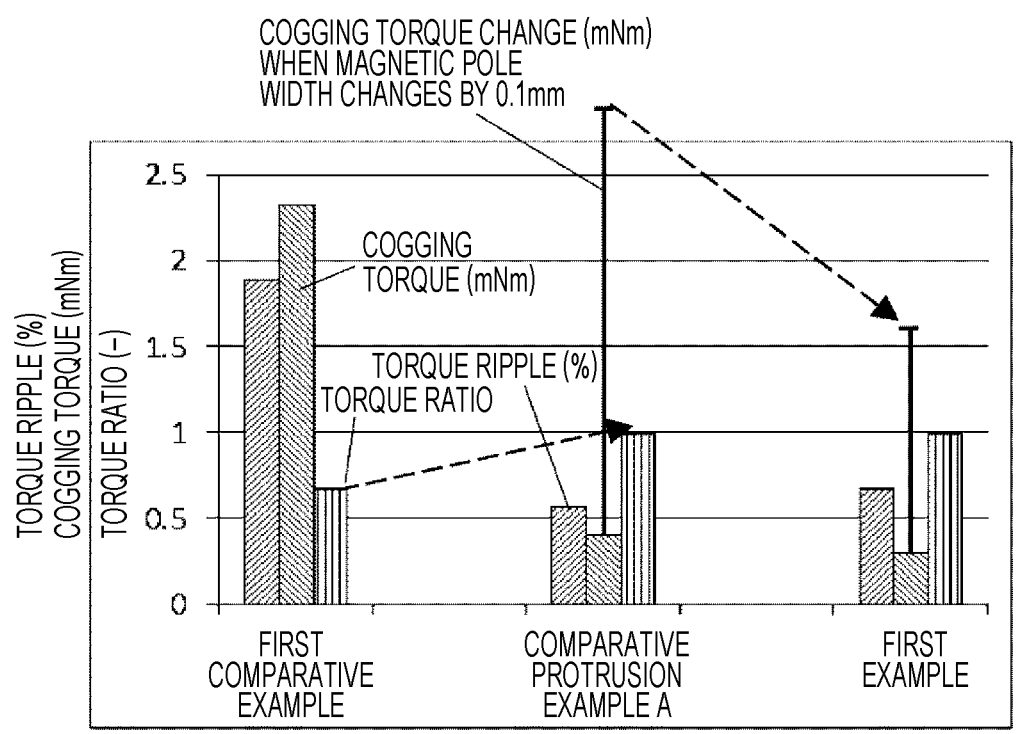
FIG. 6 is a diagram for describing a difference in cogging torque between the first example according to the invention, the first comparative example, and Comparative Protrusion Example A.

FIG. 6 is a diagram for describing a difference in cogging torque of a first example according to the invention, Comparative Protrusion Example A, and a first comparative example. In FIG. 6, a case where a comparative protrusion 222d having the shape illustrated in FIG. 4 is formed on the magnetic pole 220 instead of the protrusion 222 is illustrated as Comparative Protrusion Example A, the IPM rotary electric machine having a general structure of a semi-cylindrical magnetic pole shape as illustrated in FIG. is illustrated as the first comparative example, the torque ripple and the cogging torque of these comparative examples and the first example according to the invention are illustrated, and the torque ratio of the first comparative example and Comparative Protrusion Example A when the torque of the first example is set to 1. Further, in FIG. 4, only the shape of the comparative protrusion 222d formed instead of the second protrusion 222b is illustrated in an enlarged manner, but the comparative protrusion 222d formed instead of the first protrusion 222a is similarly illustrated such that the root portion has a thicker shape than the tip portion.

In addition, the values of the torque ripple and the cogging torque in each example illustrated in FIG. 6 are obtained by calculating the magnetic flux distribution of the stator 10, the rotor 20, and the air gap 30 and the electromagnetic stress of the air gap 30 by a magnetic field analysis using a finite element method, and calculating the torque corresponding to the rotation angle. Further, the first example corresponds to the permanent magnet rotary electric machine 1 of the first embodiment having the magnetic pole structure illustrated in FIGS. 3A and 3B.

In a case where the air gap length is 0.5 mm, in the first example as illustrated in FIG. 6, the cogging torque is calculated to be 0.3 mN·m, and the change in the cogging torque when the magnetic pole width Wp is changed by 0.1 mm is calculated to be 1.3 mN·m. On the other hand, in Comparative Protrusion Example A, the cogging torque is calculated to be 0.4 mN·m, and the change in the cogging torque when the magnetic pole width Wp is changed by 0.1 mm is calculated to be 2.5 mN·m. In addition, in the first comparative example, the cogging torque is calculated to be 2.3 mN·m, and the change in the cogging torque when the magnetic pole width is changed by 0.1 mm along with the width of the magnet storage space is calculated to be 0.1 mN·m.

From FIG. 6, it can be seen that the cogging torque of the first comparative example is larger than that of the first example and Comparative Protrusion Example A. The reason is that, in the magnetic pole shape as in the first comparative example, the permeance changes rapidly in the circumferential direction of the magnetic pole tip, so that a higher-order component occurs in addition to the basic order of the cogging torque. In addition, it can be seen that the change in the cogging torque with respect to the change in the magnetic pole width is smaller in the first comparative example than in the first example and Comparative Protrusion Example A. The reason is that, in the structure like the first comparative example, since the magnet is substantially parallel to the circumferential direction, the area of the polar surface of the magnet is smaller than that of the first example and Comparative Protrusion Example A, and the magnetic flux passing through the magnetic pole is smaller, so that the influence of the change of the magnetic pole width on the cogging torque is small.

On the other hand, in the VIPM structure such as the first example and Comparative Protrusion Example A, the area of the polar surface of the magnet per unit axial length can be increased as compared with the first comparative example. For example, in the first example, the area of the magnetic pole surface of the magnet per unit axial length can be about twice as large as that of the first comparative example. Therefore, the amount of magnetic flux passing through one magnetic pole can be made larger than in the first comparative example. However, when the amount of magnetic flux passing through the magnetic pole is increased, the magnetic flux at the magnetic pole tip is also increased, so that the cogging torque is further increased as it is. Therefore, in a rotary electric machine having a VIPM structure, it is effective means to provide a protrusion at the magnetic pole tip in order to increase the magnetic flux amount and moderately change the magnetic flux amount at the magnetic pole tip.

As an example, it is conceivable to provide the comparative protrusion 222d having a shape as illustrated in FIG. 4 at both ends of the outer peripheral surface of the magnetic pole. However, the comparative protrusion 222d has a larger thickness at the root portion connected to the base 230 as compared with the protrusion 222 of this embodiment. Therefore, the magnetic flux reaching the tip of the comparative protrusion 222d is larger than that of the protrusion 222d. As a result, when the magnetic pole width Wp changes, and the tip position of the comparison protrusion 222d changes, the change in the magnetic flux of the air gap near the magnetic pole tip becomes larger than that of the protrusion 222, so that it is conceivable that the change in the cogging torque increases. In FIG. 6, in the first example, the change in the cogging torque when the magnetic pole width Wp is changed by 0.1 mm is 1.3 mN·m, whereas the change is 2.5 mN·m in Comparative Protrusion Example A, which is for these reasons.

As described above, according to the configuration of this embodiment, it can be seen that the cogging torque can be sufficiently reduced. In addition, it can be seen that the fluctuation of the cogging torque with respect to the dimensional error of the magnetic pole can be sufficiently reduced, so that the dimensional accuracy required at the time of manufacturing can be reduced and the manufacturing cost can be reduced.

In addition, as illustrated in FIG. 6, the torque ripple in the first example is 0.68%, while the torque ripple in Comparative Protrusion Example A is 0.58%, and the torque ratio based on the first example is almost 1. On the other hand, in the first comparative example, the torque ripple is 1.9%, and the torque ratio based on the first example is 0.68. Therefore, according to the configuration of this embodiment and Comparative Protrusion Example A, it can be seen that a permanent magnet rotary electric machine which has low torque ripple, is small, and has a large torque output can be realized.

Further, with the use of the permanent magnet rotary electric machine 1 of this embodiment for the EPS device, it is possible to suppress vibration and noise propagating in the vehicle interior. In addition, vibration and noise can be suppressed by applying the invention to other electric auxiliary equipment for automobiles, for example, an electric auxiliary equipment for automobile which performs electric braking. Furthermore, the application of the permanent magnet rotary electric machine 1 of this embodiment is not limited to the field of automobiles, but can be applied to all industrial permanent magnet rotary electric machines for which low vibration is preferable.

Second Embodiment

Figure 7:
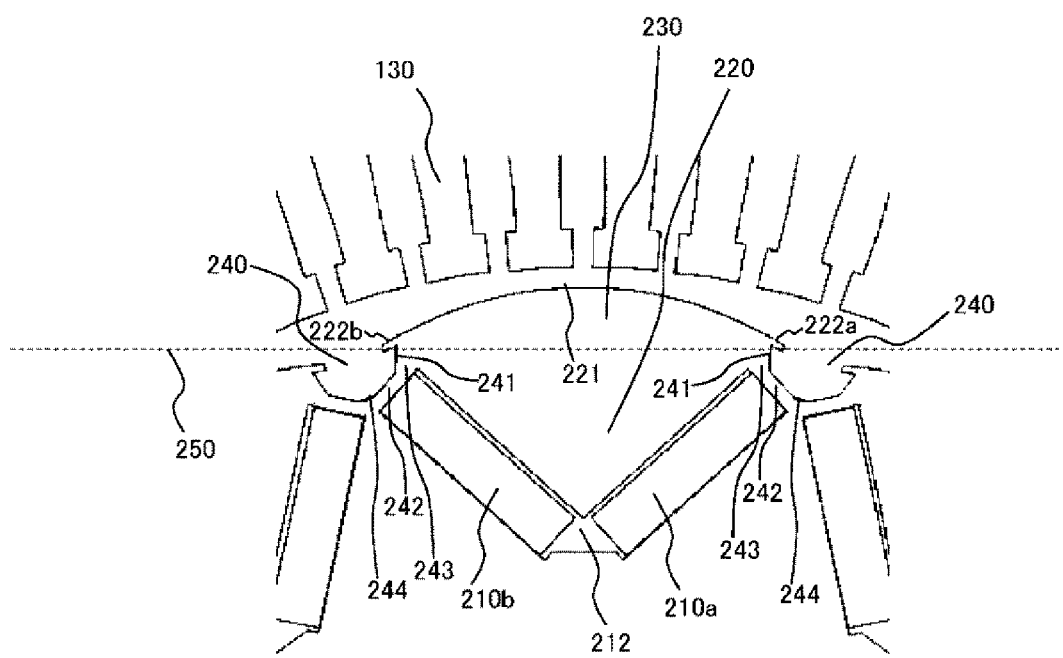
FIG. 7 is an enlarged view of the vicinity of a magnetic pole of a cross section of a rotor according to a second embodiment of the invention.

Next, the permanent magnet rotary electric machine 1 according to a second embodiment of the invention will be described with reference to FIG. 7. FIG. 7 is an enlarged view of the vicinity of the magnetic pole of the cross section of the rotor 20 according to the second embodiment, and corresponds to FIG. 3A described in the first embodiment. Further, the description of common portions to the first embodiment is partially omitted.

Although the permanent magnet rotary electric machine 1 described in the first embodiment is a rotating machine of 14 poles and 18 slots concentrated winding, the permanent magnet rotary electric machine 1 of this embodiment is a rotating machine of 10 poles and 60 slots distributed winding. The stator 10 of this embodiment is formed, for example, as follows. First, a plurality of radial teeth 130 are formed on the inner peripheral side by a stator core laminated body in which integral punched cores of electromagnetic steel sheets are laminated. Next, a winding is wound around each of the teeth 130 to form the winding 140, which is then shrink-fitted or press-fitted into a housing (not illustrated) to be integrated. Thus, the stator 10 is formed.

The magnetic pole 220 in the permanent magnet rotary electric machine 1 of this embodiment has a structure similar to that of the first embodiment, as illustrated in FIG. 7. In other words, the magnetic pole 220 includes the first protrusion 222a and the second protrusion 222b, and as in FIG. 3B illustrated in the first embodiment, the surface between the end of the first protrusion 222a (the second protrusion 222b) and the side surface portion 241 is located on the outer diameter side from the first line segment 250. With this configuration, the first protrusion 222a and the second protrusion 222b are formed such that spaces are provided between the first line segment 250 and the first protrusion 222a and the second protrusion 222b, respectively. Further, in this embodiment, similarly to the first embodiment, only one of the first protrusion 222a and the second protrusion end 225b may be shaped as illustrated in FIG. 3B. Even in such a case, it is possible to reduce the change in the cogging torque with respect to the change in the magnetic pole width Wp to some extent while reducing the cogging torque itself.

When the characteristics of the permanent magnet rotary electric machine 1 of this embodiment are calculated by magnetic field analysis, the cogging torque is 0.3 mN·m, and the change in the cogging torque when the magnetic pole width Wp is changed by 0.1 mm is 0.6 mN·m. On the other hand, in a rotary electric machine having 10 poles 60 slots distributed winding as illustrated in FIG. 7, when a case where the comparative protrusion 222d having the shape illustrated in FIG. 4 is formed in the magnetic pole 220 instead of the protrusion 222 is assumed to be Comparative Protrusion Example B, in this Comparative Protrusion Example B, the cogging torque is calculated to be 0.8 mN·m, and the change in the cogging torque when the magnetic pole width Wp is changed by 0.1 mm is calculated to be 1.6 mN·m. Therefore, it has been confirmed that the invention is also effective in a combination of pole slots other than the 14-pole 18-slot concentrated winding and the winding method.

In addition, the torque ripple of this embodiment is 0.82%, and the torque ripple of Comparative Protrusion Example B is 0.85%. In each case, the torque ripple is sufficiently small. Further, the torque ratio of Comparative Protrusion Example B based on this embodiment is almost 1, and the torque is equivalent. Further, the above torque ripple and cogging torque are calculated by the same method as in FIG. 6, with the air gap length set to 0.7 mm.

Third Embodiment

Figure 8A:
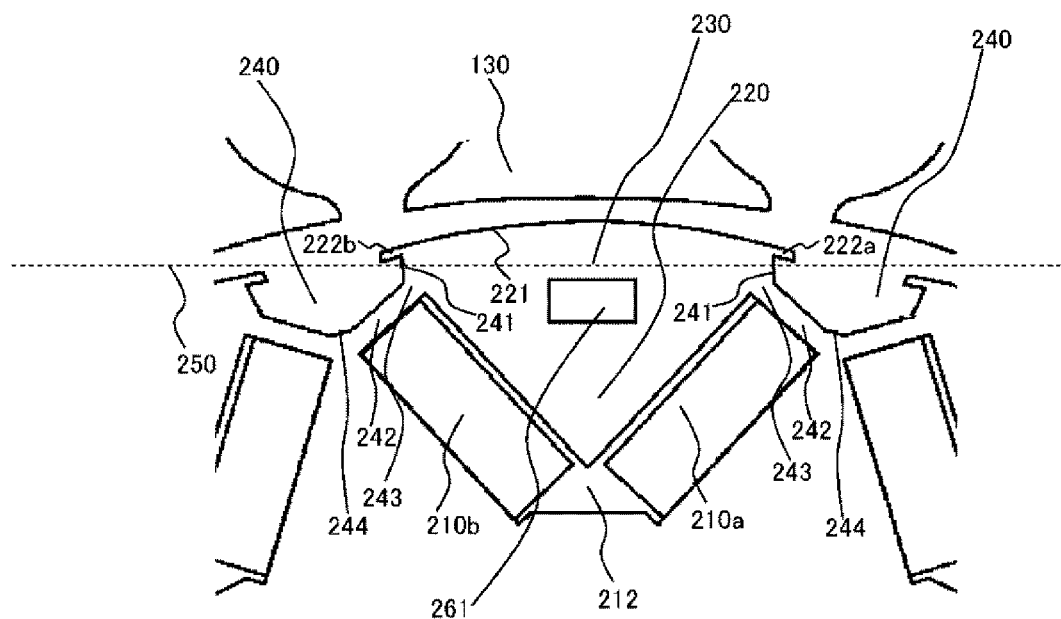
FIG. 8A is an enlarged view of the vicinity of a magnetic pole of a first plate in a rotor according to a third embodiment of the invention.
Figure 8B:
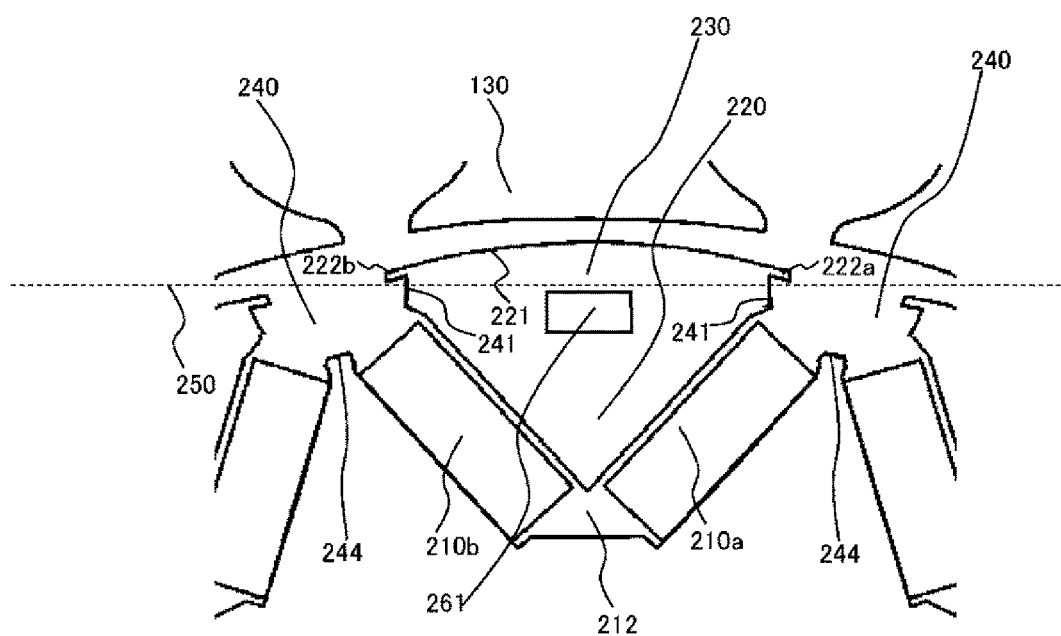
FIG. 8B is an enlarged view of the vicinity of the magnetic pole of a second plate in the rotor according to the third embodiment of the invention.
Figure 8C:
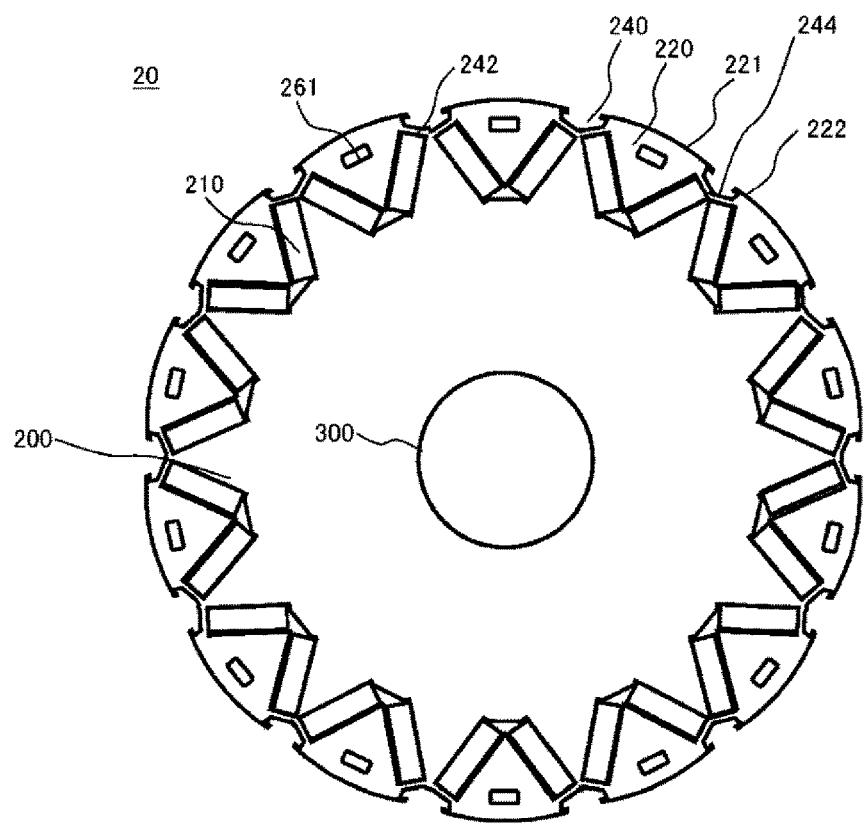
FIG. 8C is a cross-sectional view of an end surface in an axial direction of the rotor according to a third embodiment of the invention.

Next, the permanent magnet rotary electric machine 1 according to a third embodiment of the invention will be described using FIGS. 8A to 9. The permanent magnet rotary electric machine 1 of this embodiment is a rotary electric machine having 14 poles and 18 slots concentrated winding, similarly to the first embodiment. FIGS. 8A, 8B, 8D, 8E, and 8F are enlarged views of the vicinity of the magnetic pole of the cross section of the rotor 20 according to the third embodiment, and correspond to FIGS. 3 and 7 described in the first and second embodiments, respectively. FIG. 8C is a cross-sectional view of the end surface in the axial direction of the rotor 20 according to the third embodiment. Further, the description of parts common to the first and second embodiments is partially omitted.

As described in the first embodiment, the rotor core 200 in the permanent magnet rotary electric machine 1 of this embodiment is configured by laminating a plurality of electromagnetic steel sheets in the axial direction. The plurality of electromagnetic steel sheets are classified into those having the shape illustrated in FIG. 8A and those having the shape illustrated in FIG. 8B. Hereinafter, the electromagnetic steel sheet having the shape illustrated in FIG. 8A will be referred to as a "first plate", and the electromagnetic steel sheet having the shape illustrated in FIG. 8B will be referred to as a "second plate". In other words, the rotor core 200 of this embodiment is configured by laminating a plurality of first plates and a plurality of second plates. The first plate and the second plate are fastened to each other in the axial direction by an axial fastening portion 261.

As illustrated in FIG. 8A, the first plate has a magnetic pole structure similar to that described in the first and second embodiments. In other words, the magnetic pole 220 of the first plate includes the first protrusion 222a and the second protrusion 222b, and as in FIG. 3B illustrated in the first embodiment, the surface between the end of the first protrusion 222a (the second protrusion 222b) and the side surface portion 241 is located on the outer diameter side from the first line segment 250. With this configuration, the first protrusion 222a and the second protrusion 222b are formed such that spaces are provided between the first line segment 250 and the first protrusion 222a and the second protrusion 222b, respectively. In addition, the magnetic pole 220 of the first plate is connected to a bridge 242 formed between the first space 240 and the storage space 212 at the connecting portion 243. On the other hand, as illustrated in FIG. 8B, the bridge 242 is not formed between the first space 240 and the storage space 212 in the second plate. For this reason, an opening penetrating between the storage space 212 and the first space 240 is formed between the magnetic pole 220 and the q-axis outer peripheral portion 244. Further, the first plate and the second plate may be manufactured in separate manufacturing steps, or the second plate may be manufactured by cutting off the bridge 242 from the first plate. In addition, in this embodiment, similarly to the first embodiment, only one of the first protrusion 222a and the second protrusion end 225b may be shaped as illustrated in FIG. 3B. Even in such a case, it is possible to reduce the change in the cogging torque with respect to the change in the magnetic pole width Wp to some extent while reducing the cogging torque itself.

As illustrated in FIG. 8C, the first plate having a bridge 242 is arranged on the end surface in the axial direction of the rotor core 200 of this embodiment. FIG. 8C differs from the cross-sectional view of FIG. 2 described in the first embodiment in that the magnetic pole 220 is provided with the axial fastening portion 261. The plurality of electromagnetic steel sheets forming the rotor core 200, that is, the plurality of first and second plates, are laminated by being mutually fastened in the axial direction by a fastening shaft (not illustrated) inserted into the axial fastening portion 261. Therefore, the permanent magnet 210 stored in the storage space 212 is held in the rotation plane by the bridge 242 of the first plate, and is connected to the laminated body of the rotor core 200.

In the rotor core 200 of this embodiment, by reducing the first plate and increasing the second plate as long as there is no problem in the strength at the time of rotation, the leakage of the magnetic flux passing through the bridge 242 is reduced, so that the torque can be increased. However, since there may be a case where one laminated plate on the axial end surface is removed in order to adjust the thickness at the time of assembly, the number of laminated first plates at the end in the axial direction at the start of assembly is desirably 2 or more at least at one end.

As described above, the rotor core 200 of this embodiment has a structure in which the plurality of first plates and second plates are fastened and laminated in the axial direction. Here, the difference between the first plate and the second plate is only the presence or absence of the bridge 242. Therefore, in the rotor core 200 of this embodiment, as illustrated in FIG. 8D, the bridge 242 is partially connected to form a three-dimensional structure having a thickness in the axial direction.

Figure 8D:
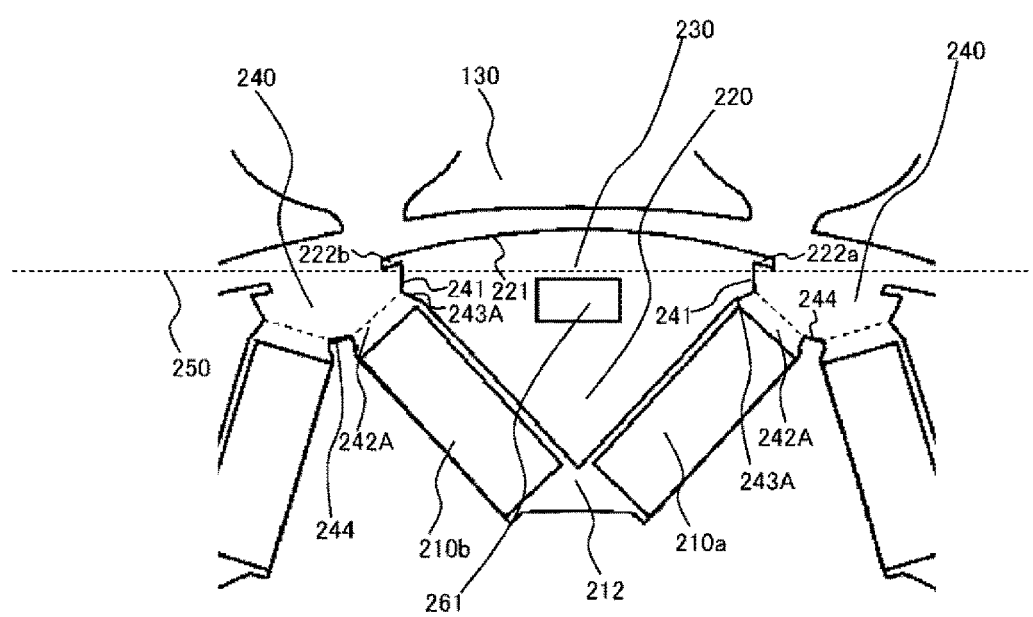
FIG. 8D is a diagram illustrating a partially connected bridge in the rotor according to the third embodiment of the invention.

Further, in FIG. 8D, the projection of the partially connected bridge 242 in the axial direction is illustrated by a partially connected bridge 242A indicated by a broken line. The magnetic pole 220 is connected to the partially connected bridge 242A at a partially connecting portion 243A.

According to this embodiment, since the bridge 242 is configured by the partially connected bridge 242A, magnetic flux leakage at this portion is reduced. Therefore, when obtaining the same torque as in the first embodiment with the same lamination thickness, the width of the polar surface of the permanent magnet 210 can be reduced, and the magnet amount can be further reduced.

Figure 8E:
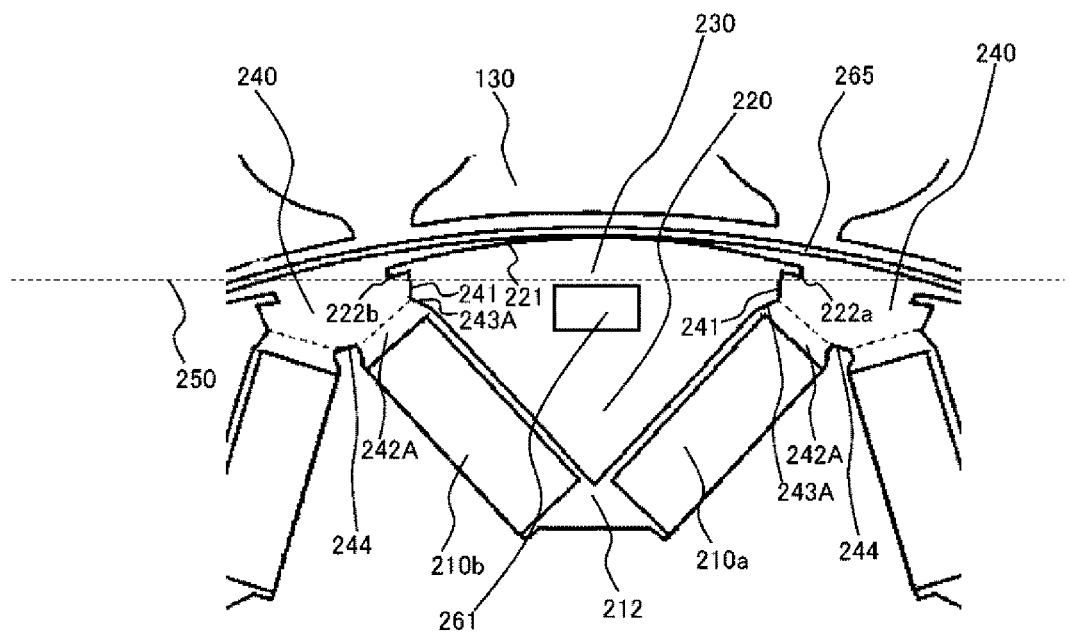
FIG. 8E is a diagram illustrating a cover which covers a rotor core according to the third embodiment of the invention.
Figure 8F:
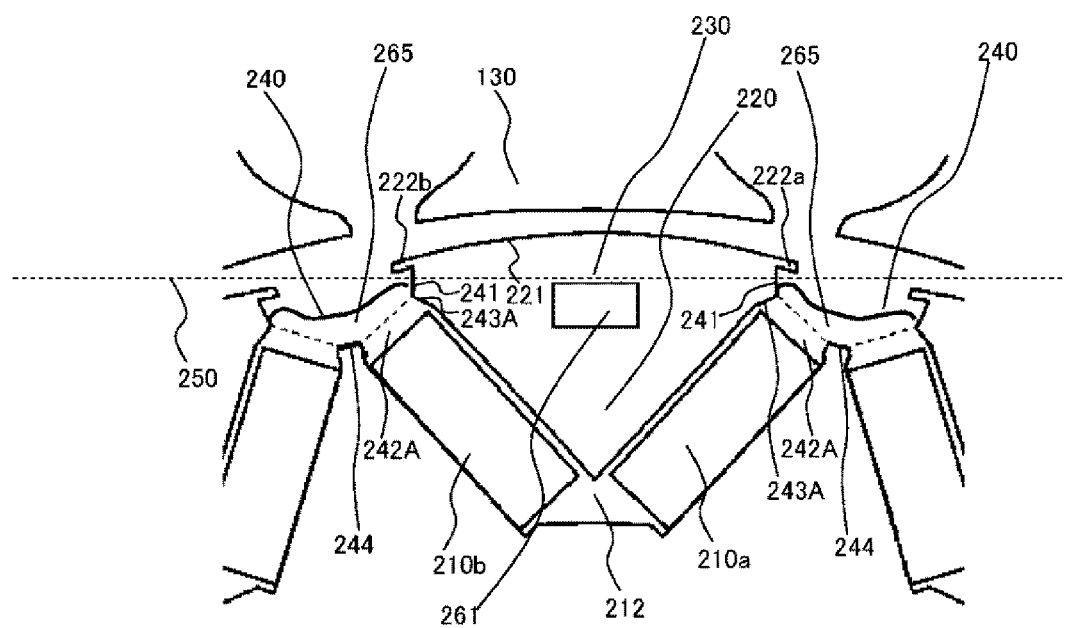
FIG. 8F is a diagram illustrating the cover which covers the rotor core according to the third embodiment of the invention.

Further, in the rotor core 200 of this embodiment, in order to prevent scattering of the permanent magnet 210, it is preferably provided a cover which can cover an opening penetrating between the storage space 212 and the first space 240 at least in the second plate. For example, as illustrated in FIG. 8E, a cover 265 which covers the surface of the rotor core 200 including the magnetic pole 220 and the first space 240 in the entire circumferential direction may be used. As a material of the cover 265, for example, a non-magnetic metal or a synthetic resin may be used. In addition, as illustrated in FIG. 8F, for example, an adhesive or a synthetic resin may be applied to the first space 240 and used as the cover 265. In this case, it is preferable to apply an adhesive or a synthetic resin also to the end in the axial direction of the rotor 20 adjacent to the first space 240, and to solidify the adhesive or the resin in a shape which covers the periphery of each magnetic pole 220. With this configuration, the cover 265 made of an adhesive or a synthetic resin is prevented from peeling off, and the scattering of the permanent magnet 210 can be prevented. In addition, at least one of the surface of the permanent magnet 210 and the surface of the cover 265 in the end surface in the axial direction of the rotor 20 may be arranged and covered with an end plate. With this configuration, it possible to further prevent the permanent magnet 210 from scattering.

Figure 5:
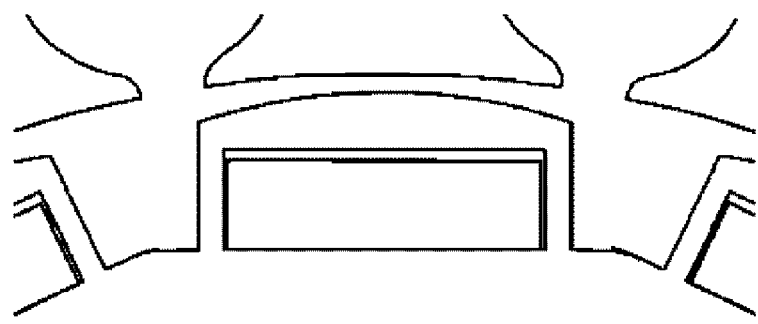
FIG. 5 is an enlarged view of the vicinity of a magnetic pole of a cross section of a rotor according to a first comparative example.
Figure 9:
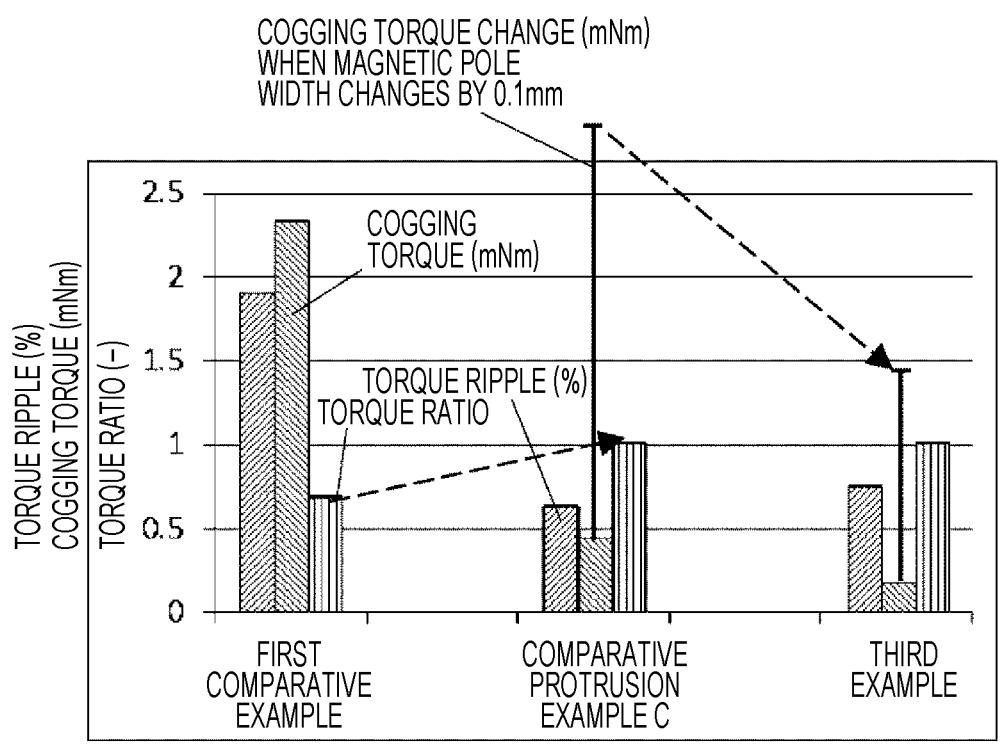
FIG. 9 is a diagram for describing a difference in cogging torque between the third example according to the invention, the first comparative example, and Comparative Protrusion Example C.

FIG. 9 is a diagram for describing a difference in cogging torque of a third example according to the invention, Comparative Protrusion Example C, and a first comparative example. In FIG. 9, in the rotary electric machine of this embodiment in which the rotor core 200 is formed by the first plate and the second plate, a case where a comparative protrusion 222d having the shape illustrated in FIG. 4 is formed on the magnetic pole 220 instead of the protrusion 222 is illustrated as Comparative Protrusion Example C, the IPM rotary electric machine having a general structure of a semi-cylindrical magnetic pole shape as illustrated in FIG. 5 described above is illustrated as the first comparative example, the torque ripple and the cogging torque of these comparative examples and the third example according to the invention are illustrated, and the torque ratio of the first comparative example and Comparative Protrusion Example C when the torque of the third example is set to 1. In addition, the torque ripple and cogging torque in each example illustrated in FIG. 9 are calculated in the same manner as in FIG. 6, with the air gap length set to 0.5 mm.

As illustrated in FIG. 9, the cogging torque of the third example is 0.43 mN·m, and the cogging torque of Comparative Protrusion Example C is 0.17 mN·m. On the other hand, the change in the cogging torque when the magnetic pole width Wp is changed by 0.1 mm is 1.3 mN·m in the third example, whereas it is as large as 2.4 mN·m in Comparative Protrusion Example C. Therefore, in consideration of the increase in the cogging torque due to the manufacturing error, the reduction of the cogging torque in Comparative Protrusion Example C is somewhat insufficient. In addition, in the first comparative example, the cogging torque is as large as 2.34 mN·m, indicating that it is difficult to achieve the object of the invention of reducing the cogging torque. Further, in the first comparative example, the change in the cogging torque when the magnetic pole width is changed by 0.1 mm with the width of the magnet storage space is as small as 0.1 mN·m, which is because the magnetic flux passing through the magnetic pole is smaller than that of the third example and Comparative Protrusion Example C.

In addition, as illustrated in FIG. 9, the torque ripple in the third example is 0.75%, while the torque ripple in Comparative Protrusion Example C is 0.63%, and the torque ratio based on the third example is almost 1. On the other hand, in the first comparative example, the torque ripple is 1.9%, and the torque ratio based on the third example is 0.68. Therefore, according to the configuration of this embodiment and Comparative Protrusion Example C, it can be seen that a permanent magnet rotary electric machine which has low torque ripple, is small, and has a large torque output can be realized.

According to this embodiment, the rigidity of the rotor core 200 at the end in the axial direction is increased while reducing the leakage of the magnetic flux passing through the bridge 242 and increasing the torque, so that the strength of the integrated rotor core 200 can be ensured. Further, in this embodiment, the ratio of the number of laminated first plates in all the laminated plates is set to 0.15, but may be set to another ratio.

Fourth Embodiment

Figure 10:
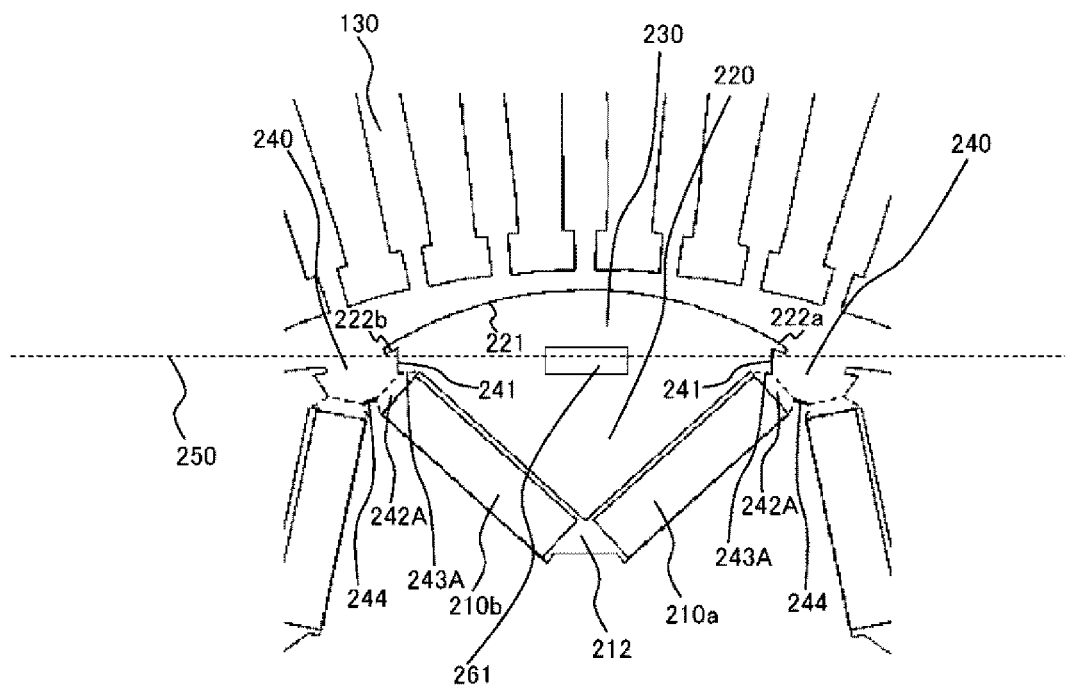
FIG. 10 is an enlarged view of the vicinity of a magnetic pole of a cross section of a rotor according to a fourth embodiment of the invention.

Next, the permanent magnet rotary electric machine 1 according to a fourth embodiment of the invention will be described with reference to FIG. 10. FIG. 10 is an enlarged view of the vicinity of the magnetic pole of the cross section of the rotor 20 according to the fourth embodiment, and corresponds to FIG. 7 described in the second embodiment.

The permanent magnet rotary electric machine 1 according to this embodiment is a rotary electric machine having 10 poles and 60 slots distributed winding, similarly to the second embodiment. In addition, the rotor core 200 of this embodiment is configured by laminating a plurality of first plates and a plurality of second plates similarly to the third embodiment. In other words, as illustrated in FIG. 10, the first plate having the bridge 242 and the second plate not having the bridge 242 are each formed by laminating in plural each, so that the bridge 242 is partially connected to form a three-dimensional structure with a thickness in the axial direction. Further, in FIG. 10, the projection of the partially connected bridge 242 in the axial direction is illustrated by the partially connected bridge 242A indicated by a broken line. The magnetic pole 220 is connected to the partially connected bridge 242A at a partially connecting portion 243A.

In addition, in the permanent magnet rotary electric machine 1 of this embodiment, the magnetic pole 220 has the same structure as in the first to third embodiments, as illustrated in FIG. 10. In other words, the magnetic pole 220 includes the first protrusion 222a and the second protrusion 222b, and as in FIG. 3B illustrated in the first embodiment, the surface between the end of the first protrusion 222a (the second protrusion 222b) and the side surface portion 241 is located on the outer diameter side from the first line segment 250. With this configuration, the first protrusion 222a and the second protrusion 222b are formed such that spaces are provided between the first line segment 250 and the first protrusion 222a and the second protrusion 222b, respectively. Further, in this embodiment, similarly to the first embodiment, only one of the first protrusion 222a and the second protrusion end 225b may be shaped as illustrated in FIG. 3B. Even in such a case, it is possible to reduce the change in the cogging torque with respect to the change in the magnetic pole width Wp to some extent while reducing the cogging torque itself.

In the configuration of this embodiment, similarly to the third embodiment, the bridge 242 is configured by the partially connected bridge 242A, so that magnetic flux leakage in this portion is reduced. Therefore, when obtaining the same torque as in the second embodiment with the same thickness, the width of the polar surface of the permanent magnet 210 can be reduced, so that the magnet amount can be further reduced. Further, in this embodiment, it is preferable to provide the cover 265 described with reference to FIGS. 8E and 8F to prevent the permanent magnets 210 from scattering, similarly to the third embodiment.

When the characteristics of the permanent magnet rotary electric machine 1 of this embodiment are calculated by magnetic field analysis, the cogging torque is 0.4 mN·m, and the change in the cogging torque when the magnetic pole width Wp is changed by 0.1 mm is 0.7 mN·m. On the other hand, in a rotary electric machine having 10 poles 60 slots distributed winding as illustrated in FIG. 10, when a case where the comparative protrusion 222d having the shape illustrated in FIG. 4 is formed in the magnetic pole 220 instead of the protrusion 222 is assumed to be Comparative Protrusion Example D, in this Comparative Protrusion Example D, the cogging torque is calculated to be 0.1 mN·m, and the change in the cogging torque when the magnetic pole width Wp is changed by 0.1 mm is calculated to be 1.7 mN·m. Therefore, it has been confirmed that the invention is also effective in a combination of pole slots other than the 14-pole 18-slot concentrated winding and the winding method.

In addition, the torque ripple of this embodiment is 1.04%, and the torque ripple of Comparative Protrusion Example D is 1.03%. In each case, the torque ripple is sufficiently small. Further, the torque ratio of Comparative Protrusion Example D based on this embodiment is almost 1, and the torque is equivalent. Further, the above torque ripple and cogging torque are calculated by the same method as in FIG. 6, with the air gap length set to 0.7 mm.

Fifth Embodiment

Figure 11A:
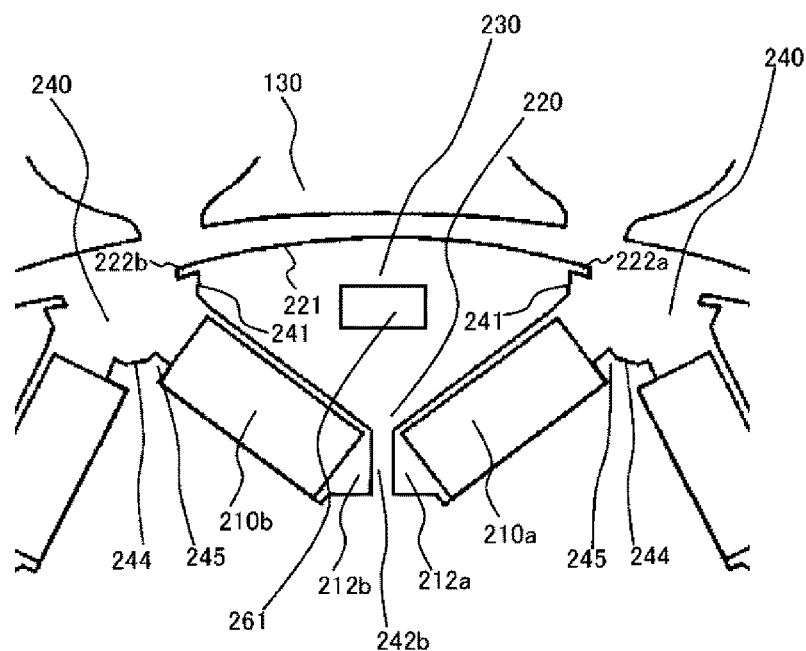
FIG. 11A is an enlarged view of the vicinity of a magnetic pole of a first plate in a rotor according to a fifth embodiment of the invention.
Figure 11B:
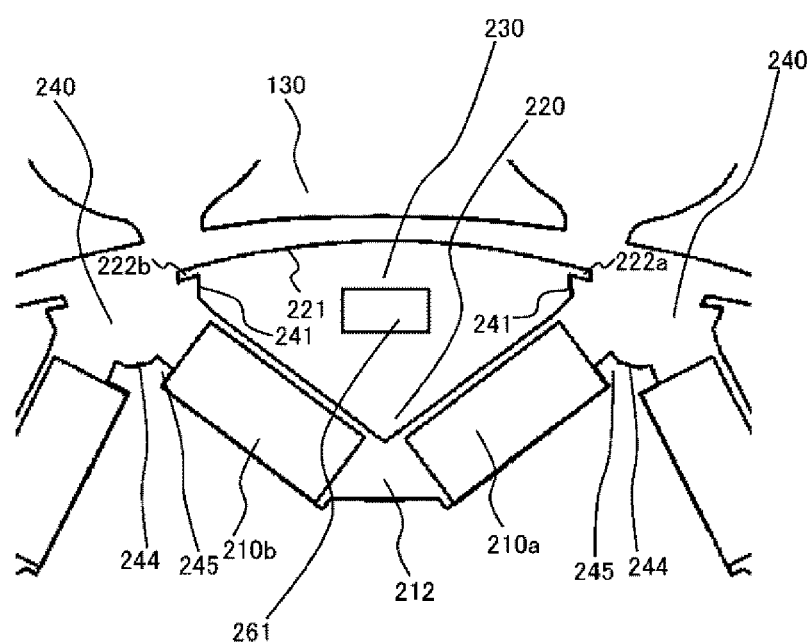
FIG. 11B is an enlarged view of the vicinity of the magnetic pole of a second plate in the rotor according to the fifth embodiment of the invention.

Next, the permanent magnet rotary electric machine 1 according to a fifth embodiment of the invention will be described using FIGS. 11A and 11B. In the rotor core 200 in the permanent magnet rotary electric machine 1 of this embodiment, the first plate and the second plate laminated in the axial direction have different shapes from that described in the third embodiment as illustrated in FIGS. 11A and 11B. Specifically, as illustrated in FIG. 11A, the first plate of this embodiment does not have the bridge 242, and instead includes a magnet fastening portion 245 which holds the permanent magnet 210 in the storage space 212. The magnetic pole 220 is configured such that the central portion thereof is connected to the rotor core 200 via a bridge 242b. In addition, as illustrated in FIG. 11B, the second plate of this embodiment is formed with the same magnet fastening portions 245 as those of the first plate. The first plate and the second plate are fastened to each other in the axial direction by the axial fastening portion 261.

In this embodiment, the central portion of the magnetic pole 220 is connected to the rotor core 200 via the bridge 242b. Therefore, as compared with the third embodiment in which both end portions of the magnetic pole 220 are connected to the rotor core 200 via the bridge 242, the magnetic pole 220 is stronger against radial direction pulling, but weaker against circumferential direction displacement. In this embodiment, the width and the number of the bridges 242b are determined in consideration of this point. Further, in comparison with the third embodiment, in this embodiment, the storage space 212 is divided into two by the central bridge 242b, and the first permanent magnet 210a and the second permanent magnet 210b are arranged to be interposed between the bridge 242b and the magnet fastening portions 245. Therefore, the width of these magnets tends to be slightly smaller.

In addition, in this embodiment, since there is no partially connected bridge 242A, an opening continuous in the axial direction is formed between the first space 240 and the storage space 212 unlike the opening portion described in the third embodiment. Therefore, in this embodiment, it is preferable to provide the cover 265 described with reference to FIGS. 8E and 8F to cover the opening so as to prevent the permanent magnets 210 from scattering, similarly to the third embodiment.

As described above, the configuration of the rotor core 200 according to each embodiment of the invention is excellent in any of the torque ripple, the cogging torque, and the torque ratio as compared with the conventional configuration, and is effective. In addition, it also shows that the effect of suppressing the fluctuation of the cogging torque against the dimensional error of the magnetic pole shape is sufficient. In other words, the structure of the permanent magnet rotary electric machine 1 described in each embodiment is a structure effective for reducing the cogging torque.

Further, even in the second to fifth embodiments, similarly to the first embodiments, with the use of the permanent magnet rotary electric machine 1 of each embodiment for the EPS device, it is possible to suppress vibration and noise propagating in the vehicle interior. In addition, vibration and noise can be suppressed by applying the invention to other electric auxiliary equipment for automobiles, for example, an electric auxiliary equipment for automobile which performs electric braking. Furthermore, the application of the permanent magnet rotary electric machine 1 of each embodiment is not limited to the field of automobiles, but can be applied to all industrial permanent magnet rotary electric machines for which low vibration is preferable.

According to the embodiments of the invention described above, the following operational advantages are achieved.

(1) The rotor core 200 is configured by a plurality of laminated plates and forms the storage space 212 for the permanent magnet 210. The rotor core 200 includes a magnetic pole 220 having the base 230 formed on the outer peripheral side of the storage space 212. A plurality of magnetic poles 220 are provided in the circumferential direction, and include the first protrusion 222a protruding from the base 230 in one circumferential direction along the outer periphery of the rotor core 200, and the second protrusion 222b which is provided on the opposite side to 222a with the base 230 interposed and protrudes from the base 230 along the outer periphery of the rotor core 200 in the other circumferential direction. At least one of the first protrusion 222a and the second protrusion 222b is located on the outer peripheral side from the first line segment 250 which is a virtual line connecting the end of the first protrusion 222a and the end of the second protrusion 222b, and is provided such that the space 251 is provided with respect to the first line segment 250. With this configuration, the cogging torque can be sufficiently reduced.

(2) In the third to fifth embodiments, the plurality of laminated plates include the first plate having the magnetic pole 220 and the bridge 242 or 242b which is connected to the magnetic pole 220, and the second plate which includes the magnetic pole 220 and do not include the bridges 242 and 242b. The magnetic pole 220 of the first plate and the magnetic pole 220 of the second plate are fastened to each other in the axial direction. With this configuration, the width of the polar surface of the permanent magnet 210 can be reduced, and the amount of magnets can be reduced.

(3) In the third and fourth embodiments, the first space 240 is formed between the bases 230 of the pair of magnetic poles 220 adjacent in the circumferential direction, and the q-axis outer peripheral portion 244 which is in contact with the first space 240 is formed in the middle of the pair of magnetic poles 220 adjacent in the circumferential direction. The bridge 242 of the first plate is provided between the storage space 212 and the first space 240 by connecting the magnetic pole 220 and the q-axis outer peripheral portion 244. In addition, an opening penetrating between the storage space 212 and the first space 240 is formed between the magnetic pole 220 of the second plate and the q-axis outer peripheral portion 244. With this configuration, it is possible to reduce the amount of magnets while securely holding the permanent magnet 210 in the storage space 212.

(4) In the fifth embodiment, the first space 240 is formed between the bases 230 of the pair of magnetic poles 220 adjacent in the circumferential direction, and the q-axis outer peripheral portion 244 which is in contact with the first space 240 is formed in the middle of the pair of magnetic poles 220 adjacent in the circumferential direction. The bridge 242b of the first plate divides the storage space 212 and is connected to the magnetic pole 220. In addition, an opening penetrating between the storage space 212 and the first space 240 is formed between the magnetic poles 220 of the first and second plates and the q-axis outer peripheral portion 244. With this configuration, an opening which is continuous in the axial direction is formed, and the amount of magnets can be further reduced.

(5) The rotor 20 includes the rotor core 200 according to any of the first to fifth embodiments, the shaft 300 fixed to the rotor core 200, and a permanent magnet 210 disposed in the storage space 212. In addition, the permanent magnet rotary electric machine 1 includes the rotor 20, and the stator 10 having the plurality of windings 140 and arranged to face the rotor 20 via a predetermined air gap 30. With this configuration, it is possible to realize a rotary electric machine with sufficiently reduced cogging torque and a rotor used in the rotary electric machine.

(6) Further, the rotor 20 includes the rotor core 200 according to any of the third to fifth embodiments, the shaft 300 fixed to the rotor core 200, a permanent magnet 210 disposed in the storage space 212, and the cover 265 which covers the above-described opening. With this configuration, it is possible to prevent the permanent magnets 210 from scattering while reducing the amount of magnets.

(7) The permanent magnet rotary electric machine 1 may be, for example, a motor for electric power steering of an automobile. In addition, in the 10-pole 60-slot distributed winding as described in the second and fourth embodiments, or the 14-pole, 18-slot concentrated winding as described in the first, third, and fifth embodiments may be applied. Therefore, the invention is applicable to various types of rotary electric machines.

(8) An automotive auxiliary electrical system for an automobile which performs the electric power steering or the electric brake using the permanent magnet rotary electric machine 1 as described above may be provided. In this way, it is possible to realize an automotive auxiliary electrical system in which vibration and noise are suppressed.

The above-described embodiments and various modifications are described as merely exemplary. The invention is not limited to the contents as long as the features of the invention are not damaged. In addition, various embodiments and modifications have been described, but the invention is not limited to these contents. Other aspects which are conceivable within a scope of technical ideas of the invention may be made within the scope of the invention.

REFERENCE SIGNS LIST 1 permanent magnet rotary electric machine
10 stator
20 rotor
30 air gap
100 stator core
110 core back
130 teeth
140 winding
200 rotor core
210 permanent magnet
210a first permanent magnet
210b second permanent magnet
212 storage space
220 magnetic pole
221 magnetic pole arc
222 protrusion
222a first protrusion
222b second protrusion
230 base
240 first space
241 side surface portion
242, 242b bridge
243 connecting portion
244 core outermost peripheral portion in q-axis direction
245 magnet fastening portion
250 first line segment
251 space facing first line segment
261 axial fastening portion
262 first plate
263 second plate
264 opening
265 cover
300 shaft

The invention claimed is:

1. A rotor core configured by a plurality of laminated plates and forming a storage space for a magnet, comprising a magnetic pole which includes a base formed on an outer peripheral side of the storage space,
  wherein a plurality of the magnetic poles are provided in a circumferential direction,
  the magnetic pole includes a first protrusion which protrudes from the base along an outer periphery of the rotor core in one circumferential direction, and a second protrusion which is provided on an opposite side of the first protrusion with the base interposed therebetween and protrudes from the base along the outer periphery of the rotor core in another direction of the circumferential direction, and
  at least one of the first protrusion and the second protrusion is on an outer peripheral side from a first line segment which is a virtual line connecting an end of the first protrusion and an end of the second protrusion, and is formed to provide a space with the first line segment, wherein
   the plurality of laminated plates include a first plate which includes a bridge connected to adjacent magnetic poles, and a second plate which includes the magnetic pole and not having the bridge,
   the magnetic pole of the first plate and the magnetic pole of the second plate are fastened to each other in an axial direction,
   a first space is formed between the bases of a pair of the magnetic poles adjacent in the circumferential direction,
   a q-axis outer peripheral portion which is in contact with the first space is formed in the middle of the pair of magnetic poles adjacent in the circumferential direction, the bridge of the first plate is provided between the storage space and the first space by connecting the magnetic pole and the q-axis outer peripheral portion, and an opening penetrating between the storage space and the first space is formed between the magnetic pole of the second plate and the q-axis outer peripheral portion.

2. The rotor core according to claim 1, wherein the bridge of the first plate is connected to the magnetic pole by dividing the storage space.

3. A rotor, comprising:
the rotor core according to claim 1,
a rotation shaft fixed to the rotor core; and
a permanent magnet disposed in the storage space.

4. A rotary electric machine, comprising:
the rotor according to claim 3; and
a stator which includes a plurality of windings and arranged to face the rotor via a predetermined air gap.

5. The rotary electric machine according to claim 4, wherein the rotary electric machine is a motor for electric power steering of an automobile.

6. The rotary electric machine according to claim 4, wherein the rotary electric machine has a configuration of 10 poles 60 slots distributed winding or 14 poles 18 slots concentrated winding.

7. An automotive auxiliary electrical system, comprising the rotary electric machine according to claim 4,
wherein the rotary electric machine is used to perform electric power steering or electric braking.

8. A rotor, comprising:
the rotor core according to claim 1;
a rotation shaft which is fixed to the rotor core;
a permanent magnet which is disposed in the storage space; and
a cover which covers the opening.

* * * * *